(12) United States Patent
Okada et al.

(10) Patent No.: US 10,476,991 B2
(45) Date of Patent: Nov. 12, 2019

(54) CHATTING TERMINAL, CHATTING SYSTEM, CHATTING DISPLAY METHOD, AND RECORDING MEDIUM

(71) Applicant: JVC KENWOOD Corporation, Yokohama-shi, Kanagawa (JP)

(72) Inventors: Naoyuki Okada, Yokohama (JP); Jiro Uzaki, Yokohama (JP); Hideaki Onoda, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 0 days.

(21) Appl. No.: 16/048,386

(22) Filed: Jul. 30, 2018

(65) Prior Publication Data

US 2019/0082035 A1    Mar. 14, 2019

(30) Foreign Application Priority Data

Sep. 11, 2017    (JP) .................. 2017-173987

(51) Int. Cl.
| | |
|---|---|
| *H04N 7/18* | (2006.01) |
| *H04L 29/06* | (2006.01) |
| *H04L 29/08* | (2006.01) |
| *G06K 9/00* | (2006.01) |

(52) U.S. Cl.
CPC ............ *H04L 67/42* (2013.01); *H04L 67/36* (2013.01); *H04L 67/38* (2013.01); *H04N 7/183* (2013.01); *G06K 9/00295* (2013.01); *H04N 7/185* (2013.01)

(58) Field of Classification Search
CPC ......... H04L 67/42; H04L 67/38; H04L 67/36; H04N 7/183; H04N 7/185; G06K 9/00295

USPC ........ 348/157, 143, 156, 153; 386/210, 224, 386/278, 281
See application file for complete search history.

(56) References Cited

U.S. PATENT DOCUMENTS

| | | | | |
|---|---|---|---|---|
| 2005/0166237 | A1* | 7/2005 | Kawakami | H04H 60/72 725/50 |
| 2014/0337427 | A1* | 11/2014 | Hamada | H04L 29/06 709/204 |

FOREIGN PATENT DOCUMENTS

JP    2008-009836    1/2008

* cited by examiner

*Primary Examiner* — Robert Chevalier
(74) *Attorney, Agent, or Firm* — Amin, Turocy & Watson LLP (57) ABSTRACT

A chatting terminal includes: a communication unit capable of receiving match progress data indicating a progress state of a match and chatting data indicating a content of a chatting corresponding to the match from a server to which the match progress data and the chatting data are uploaded; a camera capable of capturing a match to acquire capturing data; a storage unit that stores the match progress data obtained by the communication unit in correlation with an upload time at which the match progress data was uploaded to the server; and a control unit that appends the match progress data corresponding to a time point at which the capturing data was acquired to the capturing data to generate appended data when the capturing data of the match is obtained by the camera in a state in which a chatting application is activated.

6 Claims, 9 Drawing Sheets

| PITCH ID | AT-BAT ID | INNING | ▲/▼ | BATT-ING ORDER | PER-SONAL ID | PITCHING RESULT INFORMATION | ON-BASE INFOR-MATION | 1ST BASE RUNNER (PERSON-AL ID) | 2ND BASE RUNNER (PERSON-AL ID) | 3RD BASE RUNNER (PERSON-AL ID) | TAG INFOR-MATION |
|---|---|---|---|---|---|---|---|---|---|---|---|
| A085 | D005 | 8 | ▼ | 5 | 005 | BALL |  | ( ) | ( ) | ( ) | TA0085 |
| A086 | D005 | 8 | ▼ | 5 | 005 | SWING |  | ( ) | ( ) | ( ) | TA0086 |
| A087 | D005 | 8 | ▼ | 5 | 005 | STRIKE |  | ( ) | ( ) | ( ) | TA0087 |
| A088 | D005 | 8 | ▼ | 5 | 005 | SINGLE | 1 | ( ) | ( ) | ( ) | TA0088 |
| A089 | D006 | 8 | ▼ | 6 | 006 | BALL |  | (005) | ( ) | ( ) | TA0089 |
| A090 | D006 | 8 | ▼ | 6 | 006 | FOUL |  | (005) | ( ) | ( ) | TA0090 |
| A091 | D006 | 8 | ▼ | 6 | 006 | SINGLE | 1 | 2ND BASE (005) | ( ) | ( ) | TA0091 |
| A092 | D007 | 8 | ▼ | 7 | 007 | SINGLE | 1 | 2ND BASE (006) | 3RD BASE (005) | ( ) | TA0092 |
| A093 | D008 | 8 | ▼ | 8 | 008 | FOUL |  | (007) | (006) | (005) | TA0093 |
| A094 | D008 | 8 | ▼ | 8 | 008 | STRIKE |  | (007) | (006) | (005) | TA0094 |
| A095 | D008 | 8 | ▼ | 8 | 008 | STRIKEOUT | 0 | (007) | (006) | (005) | TA0095 |
| A096 | D009 | 8 | ▼ | 9 | 009 | SWING |  | (007) | (006) | (005) | TA0096 |
| A097 | D009 | 8 | ▼ | 9 | 009 | STRIKE |  | (007) | (006) | (005) | TA0097 |
| A098 | D009 | 8 | ▼ | 9 | 009 | SINGLE | 1 | 2ND BASE (007) | 3RD BASE (006) | HOME (005) | TA0098 |
| A099 | D010 | 8 | ▼ | 1 | 001 | GROUNDER TO 2ND | 0 | (009) | (007) | (006) | TA0099 |
| A100 | D011 | 8 | ▼ | 2 | 002 | FLY OUT TO RIGHT FIELD | 0 | (009) | (007) | (006) | TA0100 |

FIG.4

| INPUT ID | INPUTTER ID | INPUT CONTENT | TAG INFORMATION |
|---|---|---|---|
| C054 | 999 | BOTTOM OF 8TH, BATTER 007 HITS TO CENTER FIELD | TC0054 |
| C055 | 052 | ○○○ | TC0055 |
| C056 | 017 | △△△ | TC0056 |
| C057 | 038 | ××× | TC0057 |
| C058 | 999 | BOTTOM OF 8TH, BATTER 008 GETS STRUCK OUT | TC0058 |
| C059 | 052 | □□□ | TC0059 |
| C060 | 038 | ○△○ | TC0060 |
| C061 | 017 | △□× | TC0061 |
| | | | |

FIG.5

| TAG INFORMATION | UPLOAD TIME |
|---|---|
| TA0085 | 10:03:05 |
| TA0086 | 10:03:21 |
| TA0087 | 10:03:55 |
| ⋮ | ⋮ |
| TA0092 | 10:08:12 |
| TC0054 | 10:08:55 |
| TC0055 | 10:09:20 |
| TA0093 | 10:09:25 |
| ⋮ | ⋮ |

CHATTING TERMINAL, CHATTING SYSTEM, CHATTING DISPLAY METHOD, AND RECORDING MEDIUM

CROSS-REFERENCE TO RELATED APPLICATION(S)

The present application claims priority to and incorporates by reference the entire contents of Japanese Patent Application No. 2017-173987 filed in Japan on Sep. 11, 2017.

BACKGROUND

The present disclosure relates to a chatting terminal, a chatting system, a chatting display method, and a recording medium.

When a match such as a sports event is held, the progress state of the match or the like may be informed of using a chatting so that a person who cannot participate in the match or cannot go to watch the match can understand the progress state of the match. Moreover, when the chatting is performed using a chatting terminal having a camera attached thereto, for example, persons can share the capturing data obtained by the camera by posting the capturing data on the chatting. JP 2008-9836 A discloses a technique of storing data of participating teams, capturing data obtained by a camera or the like, match result data, and the like in a server managed by the sponsor of a competition such as a match and outputting images and the like using the data.

The technique disclosed in JP 2008-9836 A outputs images using data that is after the end of a match and does not use real-time data during the match.

SUMMARY

It is an object of the present disclosure to at least partially solve the problems in the conventional technology.

A chatting terminal according to one embodiment includes a terminal-side camera configured to be able to acquire capturing data, a communication unit configured to be able to receive match progress data indicating a progress state of a match and chatting data indicating a content of a chatting corresponding to the match from a server to which the match progress data and the chatting data are uploaded and configured to be able to transmit data including the chatting data and the capturing data obtained by the terminal-side camera to the server, a storage unit that stores the match progress data obtained by the communication unit in correlation with an upload time at which the match progress data was uploaded to the server, and a control unit that appends image data that is based on the match progress data corresponding to a time point at which the capturing data was acquired to the capturing data to generate appended data when the capturing data of the match is obtained by the terminal-side camera in a state in which a chatting application that displays the match progress data and the chatting data obtained by the communication unit in different regions of a display unit is activated.

A chatting system according to one embodiment includes a server to which match progress data indicating a progress state of a match and chatting data indicating a content of a chatting corresponding to the match are uploaded, and a chatting terminal includes a terminal-side camera configured to be able to acquire capturing data, a communication unit configured to be able to receive the match progress data and the chatting data from the server and configured to be able to transmit data including the chatting data and the capturing data obtained by the terminal-side camera to the server, a storage unit that stores the match progress data obtained by the communication unit in correlation with an upload time at which the match progress data was uploaded to the server, and a control unit that appends image data that is based on the match progress data corresponding to a time point at which the capturing data was acquired to the capturing data to generate appended data when the capturing data of the match is obtained by the terminal-side camera in a state in which a chatting application that displays the match progress data and the chatting data obtained by the communication unit in different regions of a display unit is activated.

A chatting display method according to one embodiment includes receiving, using a chatting terminal, match progress data indicating a progress state of a match and chatting data indicating a content of a chatting corresponding to the match from a server to which the match progress data and the chatting data are uploaded, capturing a match using the terminal-side camera provided in the chatting terminal to acquire capturing data, storing the received match progress data in correlation with an upload time at which the match progress data was uploaded to the server, and appending image data that is based on the match progress data corresponding to a time point at which the capturing data was acquired to the capturing data to generate appended data when the capturing data of the match is obtained by the terminal-side camera in a state in which a chatting application that displays the received match progress data and the received chatting data in different regions of a display unit is activated.

A non-transitory computer readable recording medium storing therein a chatting display program according to one embodiment causes a computer to execute a process of receiving, using a chatting terminal, match progress data indicating a progress state of a match and chatting data indicating a content of a chatting corresponding to the match from a server to which the match progress data and the chatting data are uploaded, a process of capturing a match using the terminal-side camera provided in the chatting terminal to acquire capturing data, a process of storing the received match progress data in correlation with an upload time at which the match progress data was uploaded to the server, and a process of appending image data that is based on the match progress data corresponding to a time point at which the capturing data was acquired to the capturing data to generate appended data when the capturing data of the match is obtained by the terminal-side camera in a state in which a chatting application that displays the received match progress data and the received chatting data in different regions of a display unit is activated.

The above and other objects, features, advantages and technical and industrial significance of the disclosure will be better understood by reading the following detailed description of presently preferred embodiments of the disclosure, when considered in connection with the accompanying drawings.

DETAILED DESCRIPTION

Hereinafter, an embodiment of a chatting terminal, a chatting system, a chatting display method, and a recording medium according to the present disclosure will be described with reference to the drawings. The present disclosure is not limited to the embodiment. Moreover, components of the embodiment below include components which can be easily replaced by those skilled in the art or components which are substantially the same as those of the embodiment.

Figure 1:
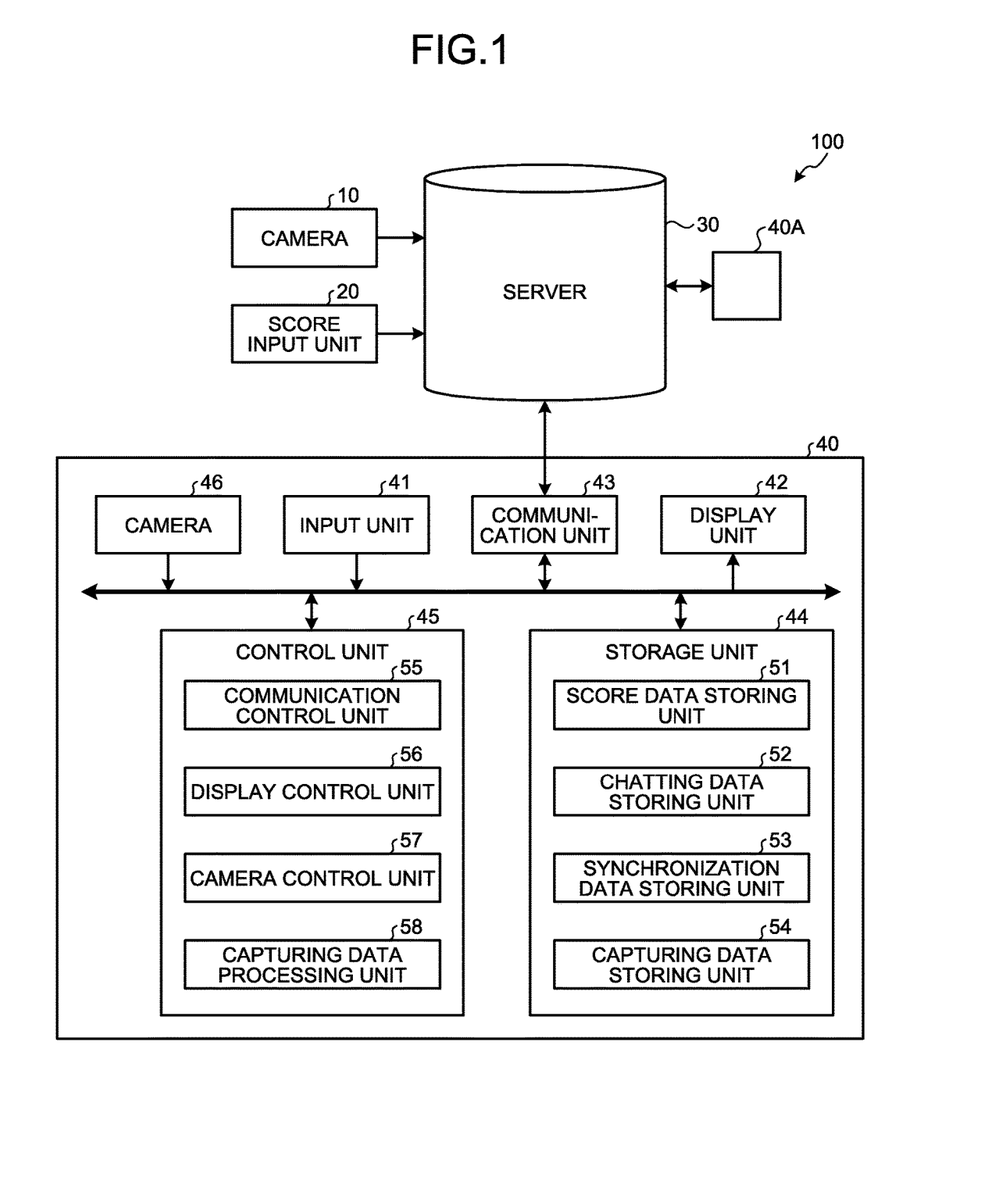
FIG. 1 is a block diagram illustrating an example of a chatting system according to the present embodiment.

FIG. 1 is a block diagram illustrating an example of a chatting system 100 according to the present embodiment. The chatting system 100 illustrated in FIG. 1 is used when users chat about the content of a match in a sports event such as a baseball, for example. By using this chatting system 100, the progress state of the match or the like can be informed of using a chatting so that a person who cannot participate in the match or cannot go to watch the match can understand the progress state of the match. Although a baseball is described as an example of a sports event, the sports event is not limited thereto, but the same description is true for other sports events such as football, volleyball, tennis, badminton, and the like. Moreover, the chatting system 100 can be applied to competitions other than sports matches such as a dance contest (a dancing competition), a piano contest (a performance competition), a contest (a card game competition or a table game competition), or a karaoke contest (a singing contest).

As illustrated in FIG. 1, the chatting system 100 includes a camera 10, a score input unit 20, a server 30, and chatting terminals 40 and 40A. The camera 10 captures the content of a match in a stadium, for example. The capturing data obtained by the camera 10 is transmitted to the server 30 and is managed in the server 30, for example. The camera 10 may be provided solely or plurally. In the present embodiment, the camera 10 may not be provided.

The score input unit 20 inputs match progress data indicating the progress state of a match to the server 30. In the present embodiment, score data is an example of the match progress data indicating the progress state of a baseball match. The score data is data that forms scores described in a scorebook of a baseball and is individual events that form a series of events starting from the pitch of a pitcher. The score is a set of items of score data. Therefore, a plurality of items of score data is created whenever a pitcher pitches a ball. Accordingly, one score is created. For example, when a batting result is a fly out to right field in a state in which a runner is on the first base, and the first base runner is tagged out, score data indicating that the batter was out, score data indicating that the batter flied to the right field, and score data indicating that the first base runner was out are created, and one score is formed from these items of score data.

In addition to the above-mentioned items of score data, the score includes other items of score data such as an action of a batter, an action of a fielder, settlement of counts, an advance state of a runner when there is a runner on a base, and other actions of batters and fielders. Specifically, the score includes score data such as a strike, a ball, a foul, a batting result, a batting type, a catching fielder, and an advance result. The batting result is information such as an out, a single, a double, a triple, and a home run. The batting type is information such as a ground, a liner, a fly, and a bunt and may be classified more finely. The catching fielder is information for specifying a fielder who actually caught a ball or the position of the fielder. The advance result is information on an advance of a runner on a base for example, "1st base to 2nd base" and may include other actions of batters and fielders.

The score input unit 20 may be an application or the like that inputs the score data to the server 30 as electronic data, for example. In this case, the score input unit 20 may be provided in a processing device such as a personal computer provided outside the server 30. Moreover, the score input unit 20 may be provided in the server 30.

The server 30 manages the chatting system 100 in an integrated manner. The server 30 has various application, data, programs, and the like for managing the chatting system 100. Although a personal computer, a workstation, or the like, for example, is used as the server 30, the server 30 is not limited thereto.

A plurality of chatting groups are set in the server 30. The chatting group is set individually for respective events, matches, or teams. The server 30 performs various processes to be described below for respective chatting groups.

The score data input by the score input unit 20 and chatting data indicating the content of a chatting corresponding to a match are input to the server 30. In the present embodiment, the chatting data includes text data, image data, and the like. The server 30 stores the input score data and chatting data. Moreover, the server 30 generates chatting data on the basis of the input score data and stores the chatting data. For example, when new score data is input, the server 30 can generate chatting data that represents the content of the score data using characters and the like. In this way, when score data is updated, the updated score data can be ascertained as chatting information.

When the server 30 stores the score data and the chatting data, the data indicating the storage time point is included in the score data and the chatting data. That is, the score data and the chatting data stored in the server 30 include the storage time data. The server 30 has a management application for managing the score data and the chatting data. Moreover, the server 30 has a chatting generation application for generating the chatting data on the basis of the input score data. Furthermore, the capturing data obtained by the camera 10 may be input to the server 30.

The chatting terminals 40 and 40A each include an input unit 41, a display unit 42, a communication unit 43, a storage unit 44, and a control unit 45. The input unit 41, the display unit 42, the communication unit 43, the storage unit 44, and the control unit 45 are connected via a bus line or the like, for example. A portable information terminal such as a cellular phone, a smartphone, a tablet, or a note-type personal computer can be used as an example of the chatting terminal 40.

The chatting terminals 40 and 40A each have a camera (a terminal-side camera) 46. The camera 46 is attached to the chatting terminals 40 and 40A.

Figure 2:
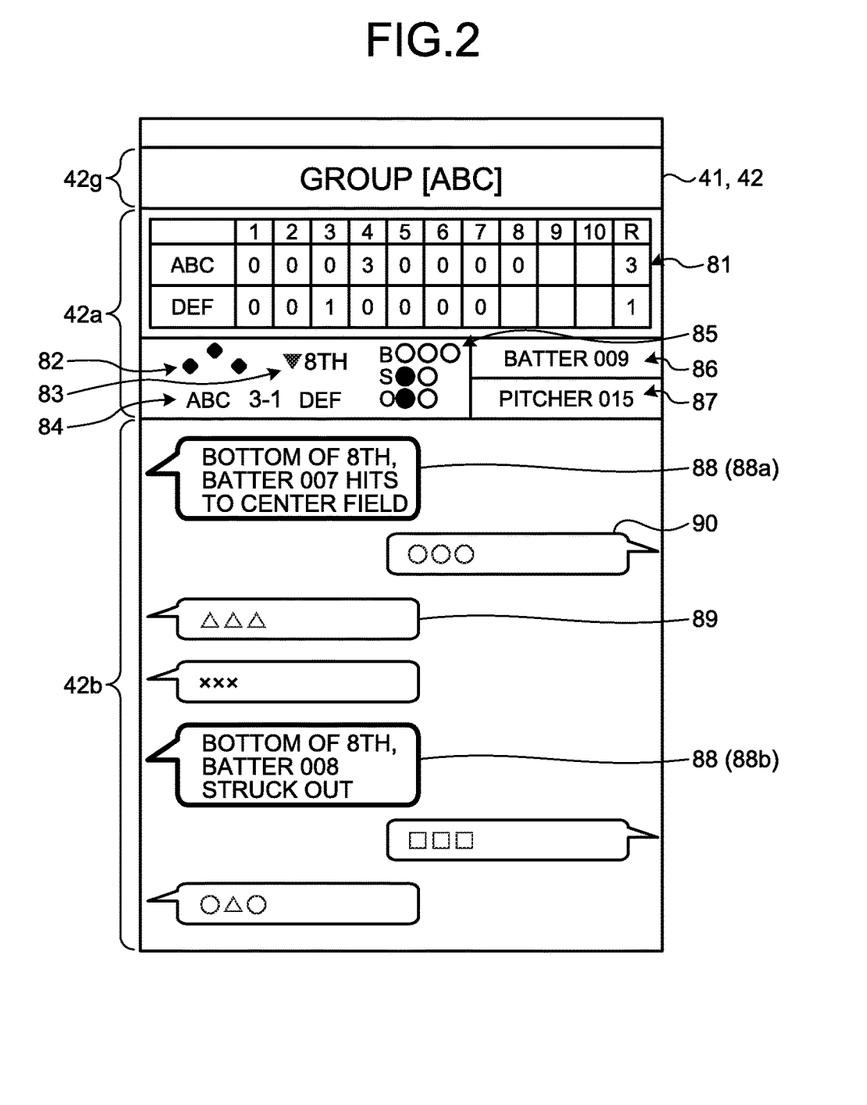
FIG. 2 is a diagram illustrating an example of an input unit and a display unit of a chatting terminal according to the present embodiment.

FIG. 2 is a diagram illustrating an example of the input unit 41 and the display unit 42 of the chatting terminal 40 according to the present embodiment. As illustrated in FIG. 2, the chatting terminal 40 has a touch panel-type input unit 41 and a touch panel-type display unit 42, for example. That is, a touch panel which is the input unit 41 is superimposed on a display panel which is the display unit 42.

A score display region 42a, a chatting display region 42b, and a group display region 42g, for example, are displayed on the display unit 42. Score data is displayed in the score display region 42a. For example, a scoreboard 81 in which scores in each inning are displayed, a runner display 82 for displaying an advance state of runners, an inning display 83 for displaying an inning, a score display 84 for displaying total scores of each team, a count display 85 for displaying ball and out counts, a batter display 86 for displaying a batter, a pitcher display 87 for displaying a pitcher, and the like are displayed in the score display region 42a. The display items of the score display region 42a are not limited thereto, and some of the display items may be omitted, for example.

Chatting data is displayed in the chatting display region 42b. For example, a server message 88 which is chatting data generated by the server 30, a third-party message 89 which is chatting data input by the chatting terminal 40A different from the chatting terminal 40, a user's message 90 which is chatting data input by the chatting terminal 40, and the like are displayed in the chatting display region 42b.

The server message 88 is a message that represents the content of the score data input to the server 30 using characters, for example. A server message 88a on an upper side in FIG. 2 is a content indicating that a batter 007 hits to center field on the bottom of the 8th inning. The score data corresponding to the server message 88a is a content indicating a pitch ID A092 in FIG. 3 to be described later, for example. Although the content indicated by the pitch ID A092 indicates that the pitching result information of a batter 007 is "single", the server 30 may add other content such as the action of a fielder of the pitch ID A092 to generate the chatting data. Moreover, a server message 88b on a lower side in FIG. 2 is a content indicating that a batter 008 gets struck out on the bottom of the 8th inning. The score data corresponding to the server message 88b is a content indicated by a pitch ID A095 in FIG. 3 to be described later, for example. Moreover, the server message 88 may be a message that includes appended data 49 (see FIG. 6).

The server message 88 and the third-party message 89 are displayed in a left-side region of the chatting display region 42b, for example. Moreover, the user's message 90 is displayed on a right-side region of the chatting display region 42b, for example. Moreover, the server message 88 and the third-party message 89 may be displayed in a distinguished manner so that the messages are displayed in figures with different border types. In this way, the server message 88 and the third-party message 89 can be distinguished from each other. Information on a group to which an operator of the chatting terminal 40 belongs is displayed in the group display region 42g. The user's message 90 may be a message composed of text data and may be a message that includes capturing data 47 and appended data 49 (see FIG. 6) to be described later.

The input unit 41 outputs a predetermined instruction signal including position information of a region on which an operation is input and an operation content when a user performs an operation such as a touch operation or a scroll operation on a predetermined region on the surface of a touch panel. The position information is set so as to correspond to the position of the display unit 42, for example. The configuration of the input unit 41 and the display unit 42 is not limited to the above-described configuration.

The communication unit 43 communicates information with an external device by cables or wirelessly. The communication unit 43 transmits and receives chatting data, score data, capturing data, and the like to and from an external server 30, for example.

The storage unit 44 has a storage such as a hard disk drive or a solid state drive, for example. An external storage medium such as a removable disc may be used as the storage unit 44. The storage unit 44 stores an operating system of the chatting terminal 40, various programs for controlling the operation of the input unit 41, the display unit 42, and the communication unit 43, a chatting application for performing a chatting according to the present embodiment, various programs, data and the like. For example, the storage unit 44 may store frame data of the score display region 42a, the chatting display region 42b, the group display region 42g, and the like to be displayed on the display unit 42.

The storage unit 44 stores a chatting display program for causing a computer to execute: a process of allowing a chatting terminal to receive match progress data indicating the progress state of a match and chatting data indicating the content of a chatting corresponding to the match from a server to which the match progress data and the chatting data are uploaded; a process of capturing the progress of a match using a camera provided in the chatting terminal to acquire capturing data; a process of storing the received match progress data in correlation with the time point at which the match progress data was uploaded to the server; and a process of appending match progress data corresponding to the time point at which the capturing data was acquired to the capturing data to generate appended data when the capturing data of a match was obtained by the camera in a state in which a chatting application for displaying the received match progress data and chatting data in different regions of a display unit is activated.

The storage unit 44 includes a score data storing unit 51, a chatting data storing unit 52, a synchronization data storing unit 53, and a capturing data storing unit 54.

Figure 3:
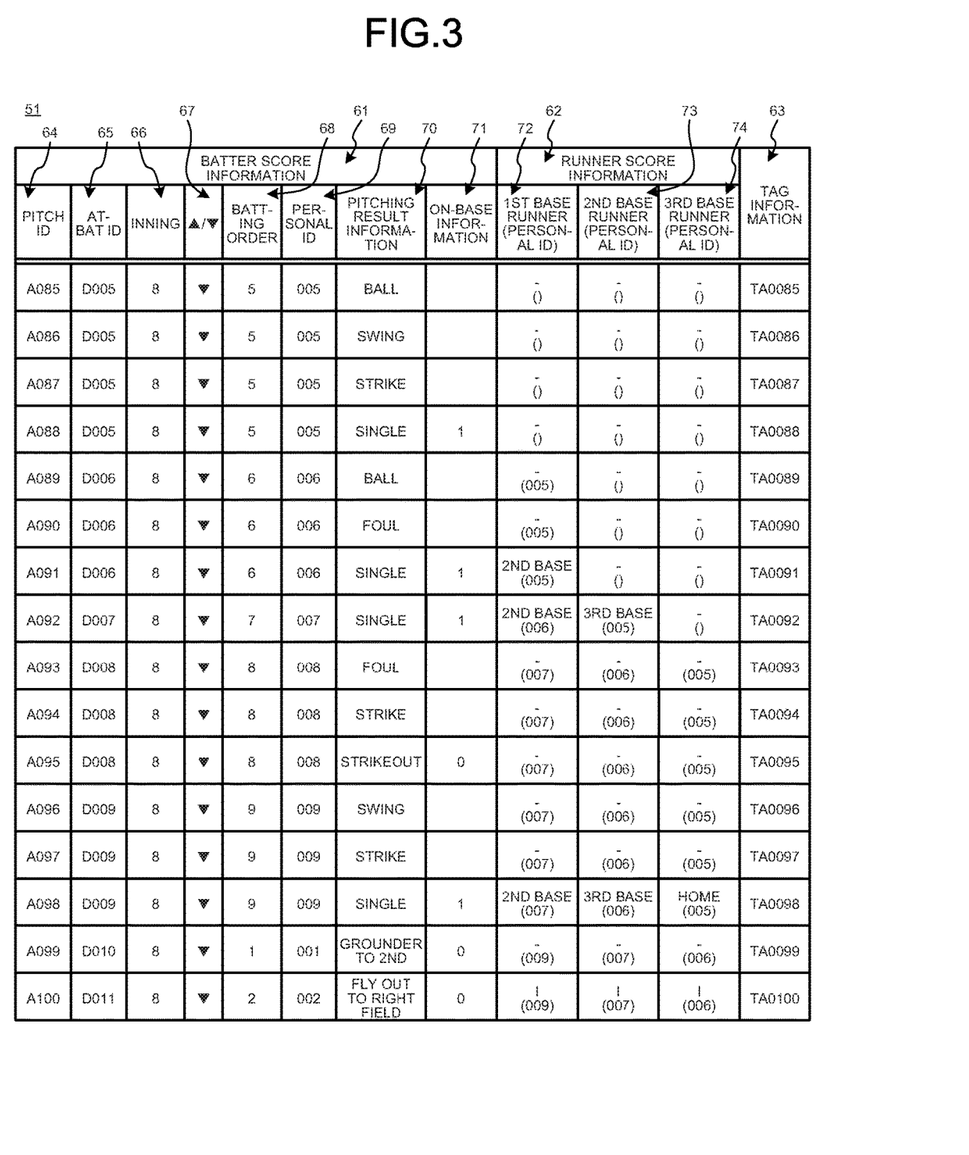
FIG. 3 is a diagram illustrating an example of score data stored in a score data storing unit.

The score data storing unit 51 stores the score data received via the communication unit 43. FIG. 3 is a diagram illustrating an example of the score data stored in the score data storing unit 51. In the example illustrated in FIG. 3, the score data of the bottom of the 8th inning is illustrated. The score data illustrated in FIG. 3 includes batter score data 61, runner score data 62, and tag information 63. The batter score data 61 includes a pitch ID 64, an at-bat ID 65, inning information 66, top/bottom information 67, batting order information 68, a personal ID 69, pitching result information 70, and on-base information 71. The score data may include other information such as actions of a fielder.

The pitch ID 64 is created whenever a pitch pitches a ball. The pitch ID 64 is assigned with a pitch ID number in ascending order of pitches as an index. The at-bat ID 65 is created whenever one at-bat is completed (that is, whenever a score is settled). The same at-bat includes one or a plurality of pitches. The at-bat ID 65 is assigned with an at-bat ID number in ascending order for one at-bat as an index.

The inning information 66 is information indicating the inning number for which the pitch ID 64 and the at-bat ID 65 are created. The top/bottom information 67 is information indicating the top or the bottom of an inning. The batting order information 68 is information indicating the batting order corresponding to one score and is represented by an integer of 1 to 9. The personal ID 69 is information for identifying the batter corresponding to one score. The personal ID 69 is correlated with information such as the name of a corresponding batter by a table or the like (not illustrated).

The pitching result information 70 is information indicating the result of one pitch ID. The pitching result information for the last pitch in one at-bat corresponds to a batting result of the at-bat. The on-base information 71 is information indicating an on-base state of a batter of the at-bat ID 65. The on-base information 71 is represented by 0 or 1, for example. When the on-base information 71 is 0, it indicates a state in which the batter hits out and could not get on a base. When the on-base information 71 is 1, it indicates that the batter gets on a base by a hit, a walk, or the like.

The tag information 63 is information for identifying score data created for each pitch ID 64. The tag information 63 is created whenever the pitch ID 64 is created. The tag information 63 is assigned with a tag number (TA0085, TA0086, . . . ) in ascending order as an index. The pitch ID number of the pitch ID 64 may be used as the tag information.

Figure 4:
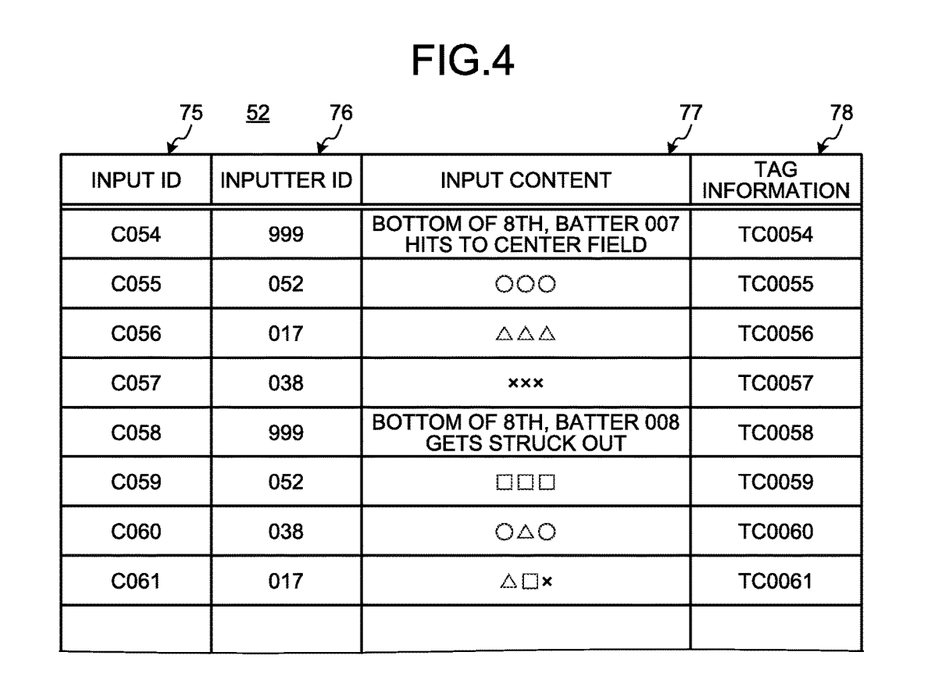
FIG. 4 is a diagram illustrating an example of chatting data stored in a chatting data storing unit.

The chatting data storing unit 52 stores the chatting data received via the communication unit 43. FIG. 4 is a diagram illustrating an example of the chatting data stored in the chatting data storing unit 52. As illustrated in FIG. 4, the chatting data includes an input ID 75, an inputter ID 76, an input content 77, and tag information 78.

The input ID 75 is created whenever the chatting data is input to or is generated by the server 30. The inputter ID 76 is information for identifying an inputter of one item of chatting data. For example, when the chatting data is generated by the server 30, the inputter ID 76 may be a predetermined value (for example, "999" or the like). The input content 77 is information indicating the content of a message displayed in the chatting display region 42*b*. The input content 77 includes character data or predetermined illustration data, for example. The tag information 78 is information for identifying the chatting data created for each input ID 75. The tag information 78 is created whenever the input ID 75 is created. The tag information 78 is assigned with a tag number (TC0054, TC0055, . . . ) in ascending order as an index. The ID number of the input ID 75 may be used as the tag information.

Figure 5:
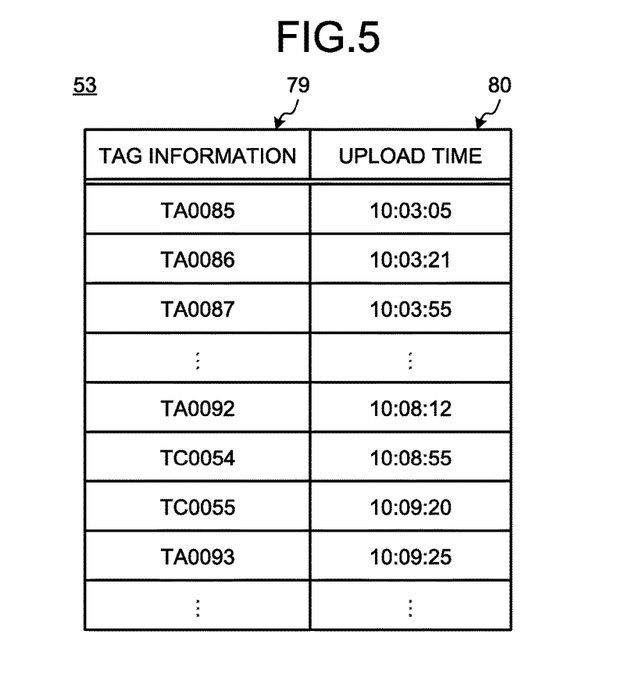
FIG. 5 is a diagram illustrating an example of synchronization data stored in a synchronization data storing unit.

The synchronization data storing unit 53 stores synchronization data that correlates score data and chatting data with each other. FIG. 5 is a diagram illustrating an example of the synchronization data stored in the synchronization data storing unit 53. As illustrated in FIG. 5, the synchronization data has tag information 79 and upload time information 80. The tag information 79 is information corresponding to the tag information 63 of the score data and the tag information 78 of the chatting data. The tag information 79 is arranged in the order corresponding to the upload time information 80. Although the tag information 79 is assigned with the same tag number (TA0085, TA0086, . . . , TA0092, TC0054, TC0055, TA0093, . . . ) as the corresponding tag information 63 and the corresponding tag information 78, the tag information is not limited thereto. For example, the tag information 79 may be assigned with a series of tag numbers independent from the tag information 63 and the tag information 78. The upload time information 80 indicates the time point at which the score data and the chatting data corresponding to the tag information 79 are uploaded to the server 30. The score data and the chatting data are stored in correlation with the upload time point using the tag information 79 and the upload time information 80.

Figure 6:
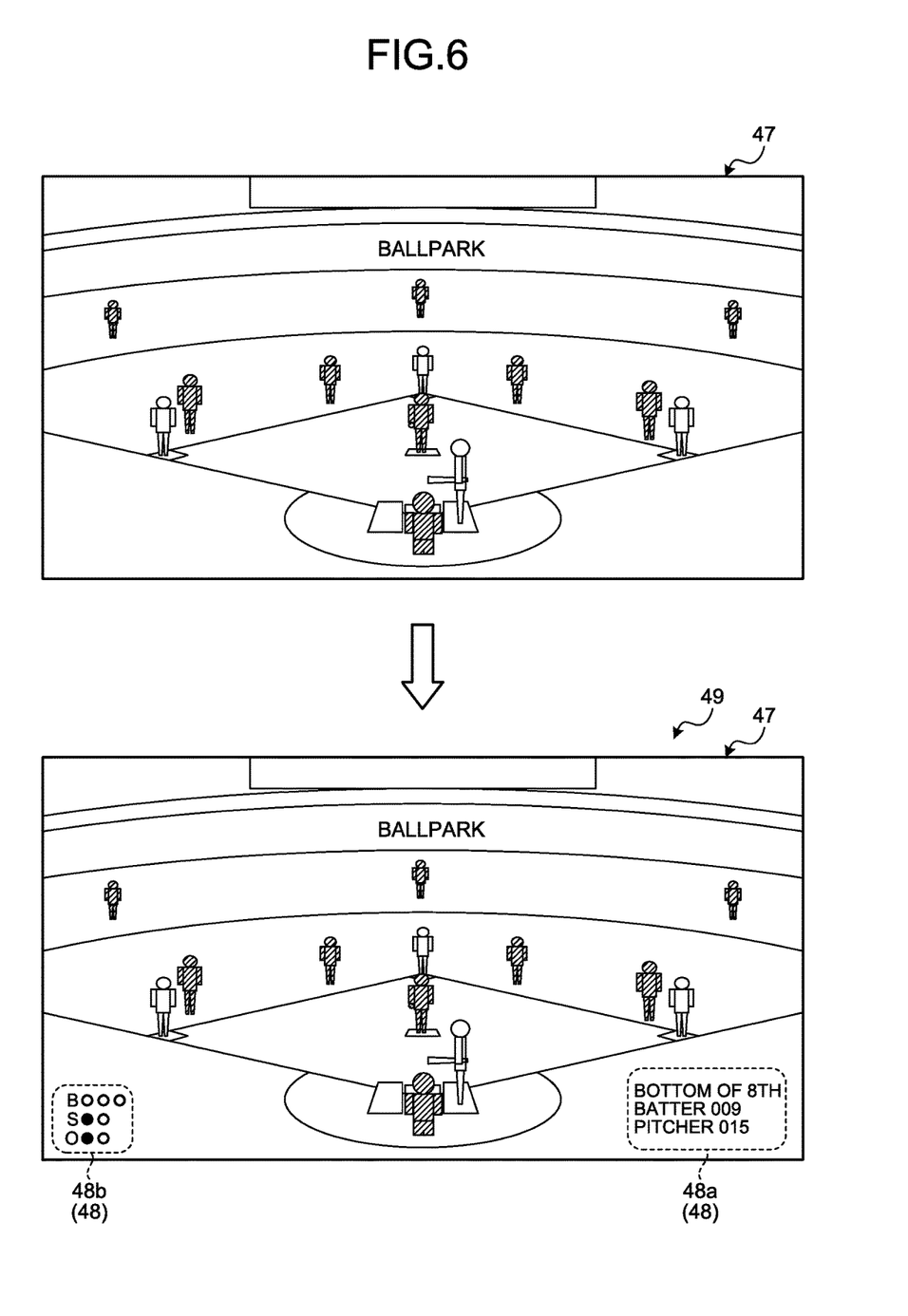
FIG. 6 is a diagram illustrating an example of image data captured by a camera of a chatting device.

The capturing data storing unit 54 stores the image data captured by the camera 46. FIG. 6 is a diagram illustrating an example of the image data captured by the camera 46 of the chatting terminal 40. As illustrated in FIG. 6, the capturing data storing unit 54 stores the capturing data 47 and the appended data 49. The capturing data 47 is the image data captured by the camera 46. The appended data 49 is image data in which score image data 48 (48*a*, 48*b*) is appended to the capturing data 47. The appended data 49 is generated on the basis of the capturing data 47. The score image data 48 appended to the appended data 49 is image data generated on the basis of the score data. That is, the appended data 49 is image data generated by combining items of image data. For example, the score image data 48 may be image data that is the same as the display image of the score data illustrated in the score display region 42*a*, and may be image data generated on the basis of the display image of the score data illustrated in the score display region 42*a*.

The control unit 45 controls the respective units of the input unit 41, the display unit 42, and the communication unit 43. Moreover, the control unit 45 performs an arithmetic operation, a process, and the like according to an instruction signal input by the input unit 41. The control unit 45 has a processing device such as a central processing unit (CPU) and a storage device such as a random access memory (RAM) or a read only memory (ROM). The control unit 45 has a communication control unit 55, a display control unit 56, a camera control unit 57, and a capturing data processing unit 58.

The communication control unit 55 accesses the server 30 via the communication unit 43 and acquires the score data and the chatting data uploaded to the server 30. The communication control unit 55 stores the acquired score data and chatting data in the storage unit 44 in correlation with the upload time. The communication control unit 55 arranges the tag information 63 of the score data and the tag information 78 of the chatting data in a time-series order of the upload time to acquire the tag information 79. The score data and the chatting data are stored in a state of being arranged in a time-series order of the upload time using the tag information 79 and the upload time information 80.

The display control unit 56 controls the display content displayed on the display unit 42. The display control unit 56 controls the display content of the score display region 42*a* on the basis of the score data stored in the storage unit 44. For example, when new score data is acquired from the server 30 and is stored in the storage unit 44, the display content of the score display region 42*a* is updated on the basis of the stored latest score data. In this way, the display control unit 56 can update the score data displayed in the score display region 42*a* on a real-time basis.

The display control unit 56 controls the display content of the chatting display region 42*b* on the basis of the chatting data stored in the storage unit 44. When displaying the chatting data in the chatting display region 42*b*, the display control unit 56 displays a number of items of chatting data that can be displayed in the chatting display region 42*b* so as to be arranged in one direction in a time-series order on the basis of the upload time. In the present embodiment, for example, as illustrated in FIG. 2, the chatting data is displayed so as to be arranged from the upper side to the lower side in the drawing of the chatting display region 42*b* in a time-series order.

When new chatting data is acquired from the server 30 and is stored in the storage unit 44, the display control unit 56 updates the display content of the chatting display region 42b on the basis of the latest chatting data stored in the storage unit 44. In this case, the display control unit 56 determines whether a space for displaying new chatting data is present under the chatting data displayed latest in the chatting display region 42b in a time-series order. When a space for displaying the new chatting data is present, the display control unit 56 displays the new chatting data in the space. Moreover, when a space for displaying the new chatting data is not present, the display control unit 56 scrolls the entire chatting display region 42b in a direction in which the oldest chatting data among the items of chatting data displayed in the chatting display region 42b in a time-series order (that is, the chatting data on the uppermost side displayed in the chatting display region 42b) is pushed toward the upper side of the chatting display region 42b. The display control unit 56 displays new chatting data in a lower space that becomes empty by the scroll. In this way, whenever new chatting data is uploaded to the server 30 and is stored in the storage unit 44, the display control unit 56 can update the chatting data displayed in the chatting display region 42b on a real-time basis.

The display control unit 56 can control the display content of the chatting display region 42b on the basis of the past chatting data stored in the storage unit 44. For example, when an operator slides a touch position toward the upper or lower side in a state in which the operator touches within the chatting display region 42b of the input unit (the touch panel) 41 (that is, when the operator scrolls the chatting display region 42b manually), the display control unit 56 changes the chatting data to be displayed in the chatting display region 42b according to a scroll direction and a scroll amount. For example, when the operator slides the touch position toward the upper side, chatting data uploaded later than the chatting data being displayed by that moment is displayed in the chatting display region 42b. Moreover, when the operator slides the touch position toward the lower side, chatting data uploaded earlier than the chatting data being displayed by that moment is displayed in the chatting display region 42b. A method of changing the chatting data displayed in the chatting display region 42b is not limited thereto, and other methods which use a button, a keyboard, a mouse, and the like may be used.

The camera control unit 57 controls the operation of the camera 46. The camera control unit 57 has a camera control application for controlling various operations of the camera 46. The camera control unit 57 controls various operations of the camera 46 such as an operation of pressing a shutter to acquire an image, on the basis of an operation signal input from the input unit 41, for example, according to the process of the camera control application. When a touch panel is used as the input unit 41, the camera control unit 57 may display an image corresponding to a shutter on the display unit 42 and acquire capturing data when a region in which the image is displayed is touched. The camera control unit 57 can acquire data that correlated the image data captured by the camera 46 with a capturing time, for example, as the capturing data.

The capturing data processing unit 58 appends the score image data 48 to the capturing data 47 obtained by the camera 46. The capturing data processing unit 58 has an image generation application that generates the score image data 48 on the basis of the score data transmitted from the server 30, for example. Moreover, the capturing data processing unit 58 has an image appending application that appends the generated score image data 48 to the capturing data 47. The image generation application and the image appending application may be integrated into one application.

The capturing data processing unit 58 generates the score image data 48 on the basis of the received score data according to the process of the image generation application. When generating the score image data 48, first, the capturing data processing unit 58 extracts information on the capturing time included in the capturing data 47. Subsequently, the capturing data processing unit 58 detects the tag information 79 of the score data of which the upload time is most recent from the extracted capturing time. Subsequently, the capturing data processing unit 58 extracts the score data corresponding to the detected tag information 79 from the score data storing unit 51. The capturing data processing unit 58 generates the score image data 48 on the basis of the extracted score data.

When the score image data 48 is generated, the capturing data processing unit 58 appends the score image data 48 to the capturing data 47 to generate the appended data 49 according to the process of the image appending application.

Generation of the score image data 48 and generation of the appended data 49 will be described in detail with reference to FIG. 6. The capturing data 47 illustrated in FIG. 6 is data captured by the camera 46 capturing a scene that is after a first ball is pitched to batter 009 on the bottom of the 8th inning. The score data at the capturing time of the capturing data 47 is the score data of the pitch ID 64 (see FIG. 3) of "A096". In this case, the capturing data processing unit 58 generates the score image data 48 on the basis of the score data of the pitch ID of A096. In the example illustrated in FIG. 6, the capturing data processing unit 58 generates the score image data 48a indicating an inning, a batter, and a pitcher and the score image data 48b indicating a ball count and an out count. The score image data 48 is not limited to the example illustrated in FIG. 6 but may indicate other items. Moreover, the capturing data processing unit 58 arranges the generated score image data 48a at the right bottom corner of the capturing data 47 and arranges the generated score image data 48b at the left bottom corner of the capturing data 47 to generate the appended data 49. The arrangement of the score image data 48 is not limited to the position illustrated in FIG. 6 but the score image data 48 may be arranged at other positions.

The capturing data processing unit 58 may be able to edit the appended data 49 from the state illustrated in FIG. 6 by an operation of the user of the chatting terminal 40. For example, the capturing data processing unit 58 may change the display of the score image data 48 according to an operation of a user when the user of the chatting terminal 40 performs an operation of changing the position of the score image data 48 or the display content of the score image data 48.

When the appended data 49 is generated, the capturing data processing unit 58 stores the generated appended data 49 in the capturing data storing unit 54 of the storage unit 44. The appended data 49 stored in the capturing data storing unit 54 can be viewed as image data and may be transmitted to the outside, for example. Moreover, the capturing data processing unit 58 may display a guidance for transmitting the generated appended data 49 to the server 30 on the display unit 42.

Figure 7:
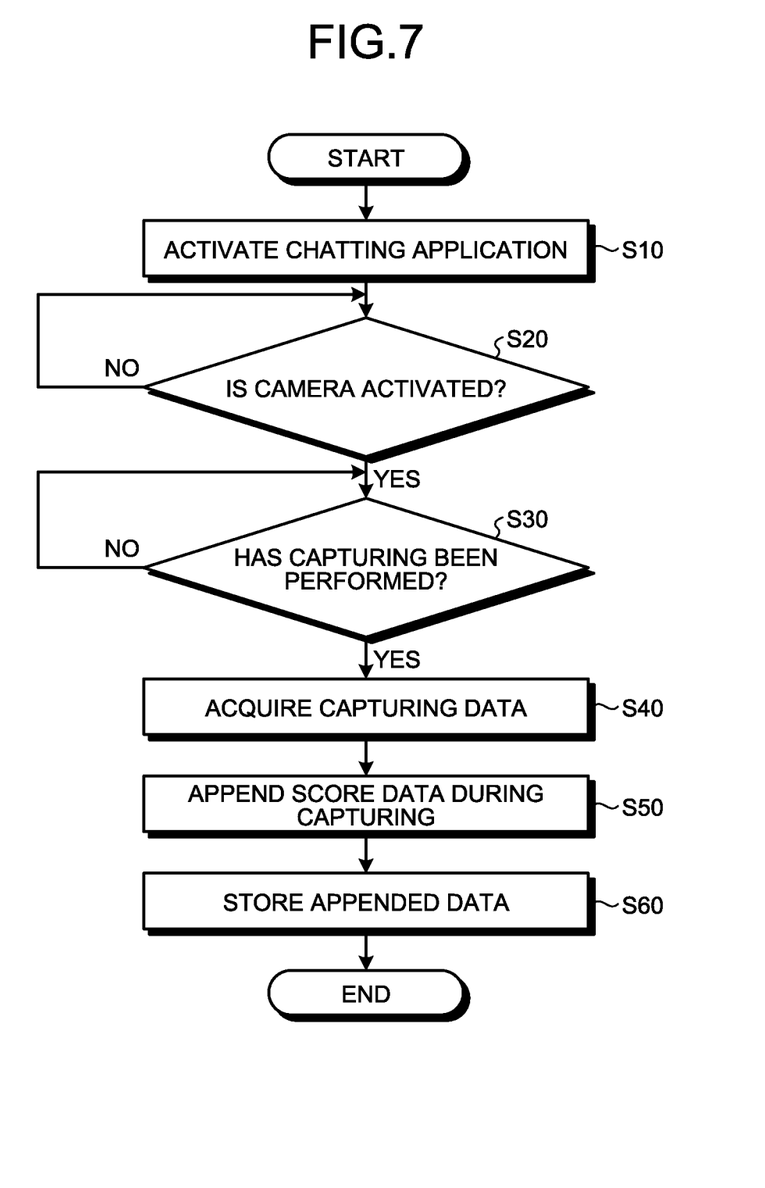
FIG. 7 is a flowchart illustrating an example of an operation of a chatting system according to the present embodiment.

Next, the operation of the chatting system 100 having the above-described configuration will be described. FIG. 7 is a flowchart illustrating an example of an operation of the chatting system 100 according to the present embodiment.

FIG. 7 illustrates an example of a chatting display method according to the present embodiment.

In the chatting system 100 according to the present embodiment, score data is input from the score input unit 20 to the server 30 with the progress of a match and chatting data is input by the chatting terminals 40, 40A, and the like. The server 30 generates chatting data on the basis of the score data. The server 30 stores the score data and the chatting data and enters a state in which data can be received from the chatting terminals 40, 40A, and the like.

In this state, the chatting terminal 40 activates the chatting application (Step S10). When the chatting application is activated, the communication control unit 55 of the chatting terminal 40 acquires the score data and the chatting data from the server 30. When the score data and the chatting data are acquired from the server 30, the communication control unit 55 stores the acquired score data and chatting data in the storage unit 44 in correlation with the upload time. The display control unit 56 controls the display content to be displayed on the display unit 42 on the basis of the score data and the chatting data stored in the storage unit 44.

In such an operation, the camera control unit 57 detects whether the camera 46 is activated in a state in which the chatting application is activated (Step S20). In Step S20, the camera control unit 57 detects whether the user or the like of the chatting terminal 40 has performed an operation of activating the camera 46, for example. When activation of the camera 46 is not detected (No in Step S20), the camera control unit 57 repeatedly performs the process of Step S20.

When activation of the camera 46 is detected (Yes in Step S20), the camera control unit 57 determines whether a capturing operation has been performed (Step S30). In Step S30, the camera control unit 57 detects an input signal from the input unit 41 and determines whether an input signal corresponding to an operation of pressing a shutter has been output. When a capturing operation is not performed (No in Step S30), the camera control unit 57 repeatedly performs the operation of Step S30. When a capturing operation is performed (Yes in Step S30), the camera control unit 57 acquires the capturing data 47 according to the process of the camera control application (Step S40).

When the capturing data 47 is acquired, the capturing data processing unit 58 appends the score image data 48 that is based on the score data at the capturing time to the capturing data 47 (Step S50). In Step S50, the capturing data processing unit 58 extracts the score data on the basis of the information on the capturing time included in the capturing data 47 and generates the score image data 48 on the basis of the extracted score data. Moreover, the capturing data processing unit 58 generates the appended data 49 by appending the generated score image data 48 to the capturing data 47. After the appended data 49 is generated, the capturing data processing unit 58 stores the generated appended data 49 in the capturing data storing unit 54 of the storage unit 44 (Step S60).

Figure 8:
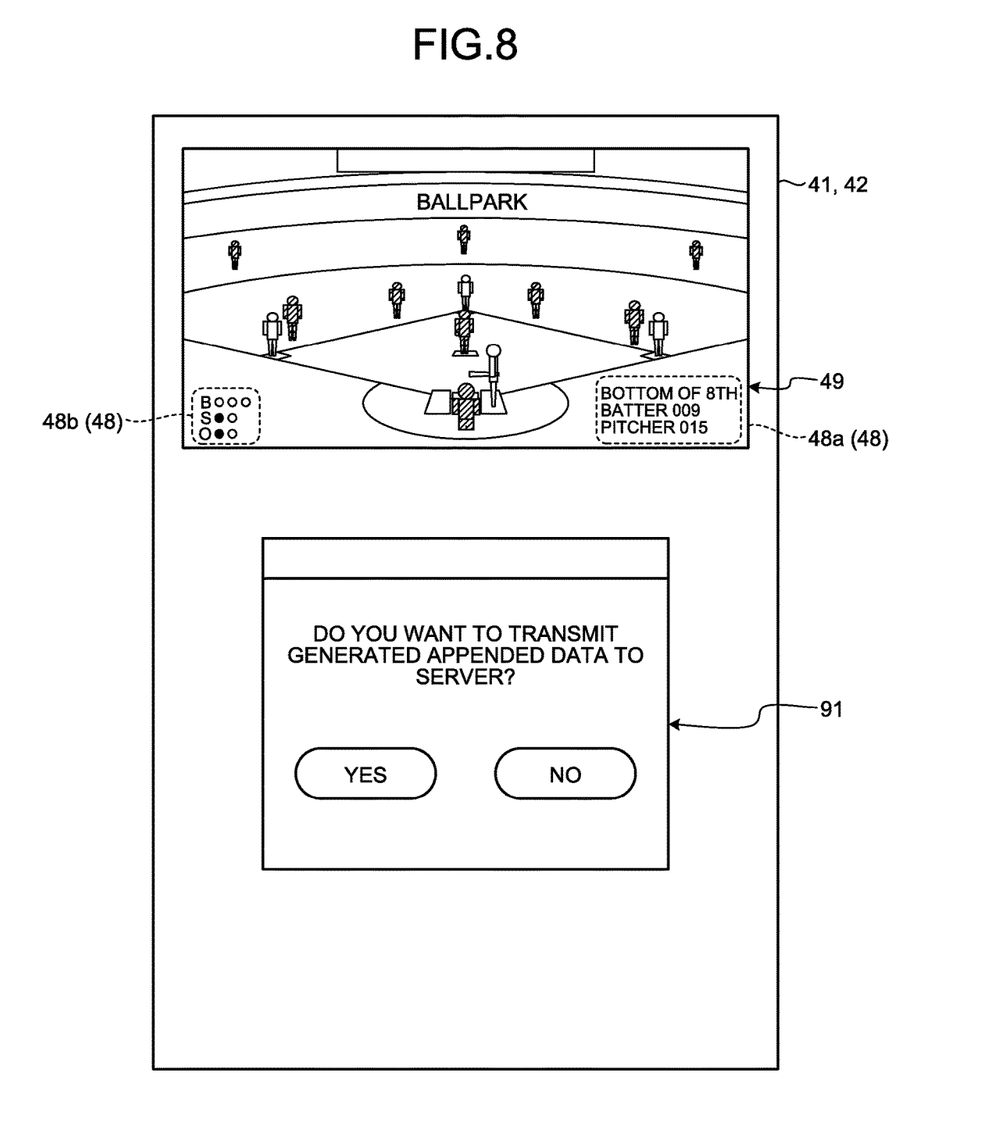
FIG. 8 is a diagram illustrating an example of a guidance displayed on a display unit.

When the appended data 49 is generated, the capturing data processing unit 58 may display a guidance for transmitting the generated appended data 49 to the server 30 on the display unit 42. FIG. 8 is a diagram illustrating an example of a guidance displayed on the display unit 42.

As illustrated in FIG. 8, the capturing data processing unit 58 may display a guidance window 91 such as a pop-up on the display unit 42 in a state in which the camera 46 is activated. The guidance window 91 has a content for allowing an operator of the chatting terminal 40 to confirm whether the generated appended data 49 will be transmitted to the server 30.

For example, when the operator operates the input unit 41 of the chatting terminal 40 to select "No" in the guidance window 91, the appended data 49 is stored in the capturing data storing unit 54 of the storage unit 44 without being transmitted to the server 30. Moreover, when the operator operates the input unit 41 of the chatting terminal 40 to select "Yes" in the guidance window 91, the appended data 49 is transmitted to the server 30.

Figure 9:
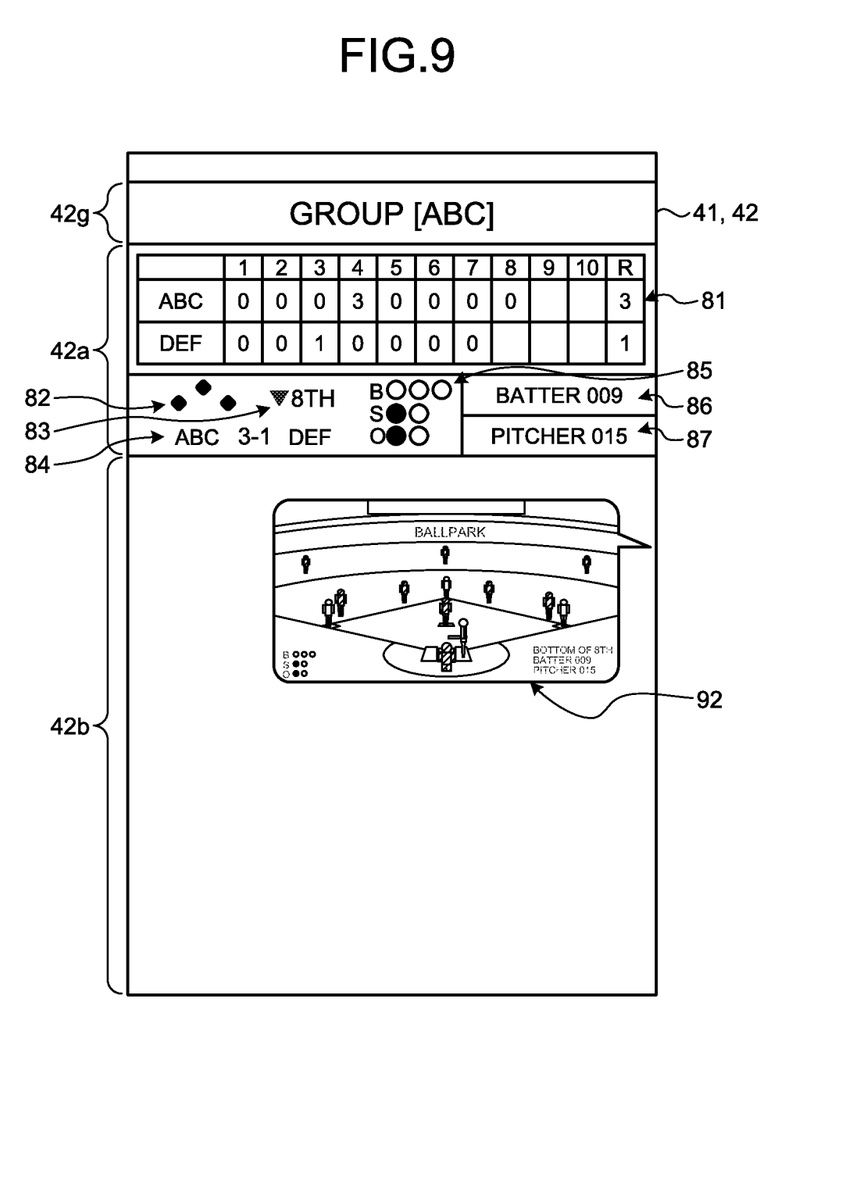
FIG. 9 is a diagram illustrating an example of a display unit of a chatting terminal.

FIG. 9 is a diagram illustrating an example of the display unit 42 of the chatting terminal 40. FIG. 9 illustrates a case in which the appended data 49 is transmitted to the server 30. When the appended data 49 transmitted from the chatting terminal 40 is received, the server 30 stores the appended data 49 as the chatting data. The chatting terminal 40 receives the appended data 49 stored as the chatting data via the communication control unit 55.

When the chatting terminal 40 receives the appended data 49, the display control unit 56 displays the received appended data 49 in the chatting display region 42b as a user's message 92 as illustrated in FIG. 9. Similarly, when another chatting terminal 40A different from the chatting terminal 40 receives the appended data 49, the display control unit 56 displays the received appended data 49 in the chatting display region 42b as the third-party message 89.

Portions corresponding to the items of appended score image data 48a and 48b appear in the user's message 92 or the third-party message 89 displayed in the chatting display region 42b. Therefore, when an operator views the message, the operator can view score display data that is based on the real-time score data together with the capturing data.

As described above, the chatting terminal 40 according to the present embodiment includes: the camera 46 configured to be able to acquire capturing data; the communication unit 43 configured to be able to receive score data indicating the progress state of a match and chatting data indicating the content of a chatting corresponding to the match from the server 30 to which the score data and the chatting data are uploaded and configured to be able to transmit data including the chatting data and the capturing data 47 obtained by the camera 46 to the server 30; the storage unit 44 that stores the score data obtained by the communication unit 43 in correlation with the upload time at which the data was uploaded to the server 30; and the control unit 45 that appends the score image data 48 that is based on the score data corresponding to a time point at which the capturing data 47 was acquired to the capturing data 47 to generate the appended data 49 when the capturing data 47 of the match is obtained by the camera 46 in a state in which a chatting application that displays the score data and the chatting data obtained by the communication unit 43 in different regions of the display unit 42 is activated.

The chatting system 100 according to the present embodiment includes: the server 30 to which score data indicating a progress state of a match and the content of a chatting corresponding to the match are uploaded; and the chatting terminal 40 including: the camera 46 configured to be able to acquire the capturing data 47; the communication unit 43 configured to be able to receive the score data and the chatting data from the server 30 and transmit data including the chatting data and the capturing data 47 obtained by the camera 46 to the server 30; the storage unit 44 that stores the score data obtained by the communication unit 43 in correlation with the upload time at which the score data was uploaded to the server 30; and the control unit 45 that appends the score image data 48 that is based on the score data corresponding to a time point at which the capturing data 47 was acquired to the capturing data 47 to generate the appended data 49 when the capturing data 47 of the match is obtained by the camera 46 in a state in which a chatting application that displays the score data and the chatting data obtained by the communication unit 43 in different regions of the display unit 42 is activated.

In this way, the score image data 48 based on the real-time score data can be shared by being appended to the capturing data 47 captured during the match. Moreover, since the chatting terminal 40 activates the chatting application and the camera 46 simultaneously so that the operation of the chatting application is synchronized with the operation of the camera 46, the processing can be performed efficiently.

In the chatting terminal 40 according to the present embodiment, the control unit 45 stores the appended data 49 in the capturing data storing unit 54 of the storage unit 44. In this way, the appended data 49 can be viewed in a manner similar to other image data.

In the chatting terminal 40 according to the present embodiment, the control unit 45 displays a guidance for transmitting the appended data 49 to the server 30 on the display unit 42. In this way, since the appended data 49 is uploaded to the server 30, the chatting system 100 can share the appended data 49 easily.

In the chatting system 100 according to the present embodiment, the chatting terminal 40 can transmit the appended data 49 to the server 30, and the server 30 stores the appended data 49 as chatting data when the appended data 49 transmitted from the chatting terminal 40 is received. In this way, since the appended data 49 is uploaded to the server 30 as the chatting data, the chatting system 100 can share the appended data 49 easily.

Figure 10:
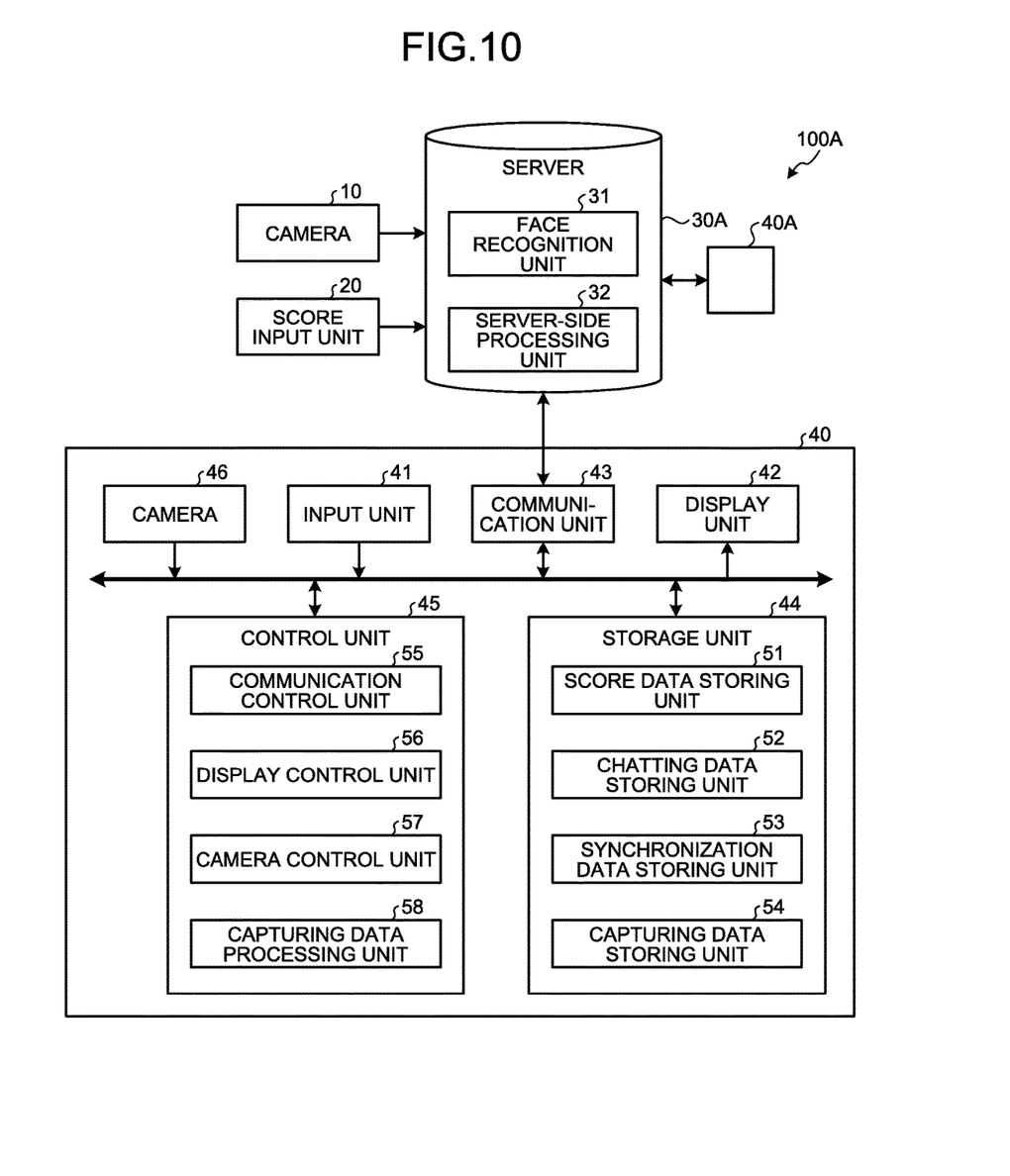
FIG. 10 is a block diagram illustrating a chatting system according to a modification.

A technical scope of the present disclosure is not limited to the above-described embodiment but may be changed appropriately without departing from the spirit of the present disclosure. FIG. 10 is a block diagram illustrating a chatting system 100A according to a modification. As illustrated in FIG. 10, in the chatting system 100A, the configuration of a server 30A is different from the configuration of the server 30 of the above-described embodiment, and the other configuration is similar to that of the above-described embodiment.

In the chatting system 100A illustrated in FIG. 10, the server 30A includes a face recognition unit 31 and a server-side processing unit 32. The face recognition unit 31 identifies a participant on the basis of a face image included in the appended data 49 and a predetermined comparison image when the face image of a participant participating in a match is included in the appended data 49. Image data obtained by capturing the faces of players of each team may be used as the predetermined comparison image, for example. The predetermined comparison image may be stored in the server 30A in advance, for example.

The server-side processing unit 32 generates the score image data 48 on the basis of the score data of the participant identified by the face recognition unit 31 and appends the generated score image data 48 to the appended data 49. In this manner, the server-side processing unit 32 reprocesses the appended data 49 transmitted from the chatting terminal 40. When the appended data 49 is reprocessed, the server-side processing unit 32 stores the same as chatting data. The chatting terminal 40 receives the appended data 49 stored as the chatting data via the communication control unit 55.

When the chatting terminal 40 receives the appended data 49, the display control unit 56 displays the received appended data 49 in the chatting display region 42*b* as the server message 88. Even when another chatting terminal 40A different from the chatting terminal 40 receives the appended data 49, the display control unit 56 displays the received appended data 49 in the chatting display region 42*b* as the server message 88.

As described above, the chatting system 100A includes the face recognition unit 31 that identifies a participant on the basis of a face image and a predetermined comparison image when the face image of the participant participating in the match is included in the appended data 49. In this way, the chatting system 100 can recognize a participant appearing in a shared image more easily.

The server 30 appends the score data of the participant identified by the face recognition unit 31 to the appended data 49. In this way, the server 30 can automatically append the score data corresponding to the identified participant to the appended data 49.

When the participant is identified by the face recognition unit 31, the appended data 49 associated with a predetermined participant may not be stored or may be transmitted to a limited destination. In this case, the predetermined participant may be set in advance in either the server 30 or the chatting terminal 40. In this way, it is possible to suppress the appended data 49 from being distributed unlimitedly and to protect the privacy of participants.

According to the present disclosure, it is possible to share the capturing data acquired during a match by adding real-time information to the capturing data.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A chatting terminal comprising:
   a terminal-side camera configured to be able to acquire capturing data;
   a communication unit configured to be able to receive match progress data indicating a progress state of a match and chatting data indicating a content of a chatting corresponding to the match from a server to which the match progress data and the chatting data are uploaded and configured to be able to transmit data including the chatting data and the capturing data obtained by the terminal-side camera to the server;
   a storage unit that stores the match progress data obtained by the communication unit in correlation with an upload time at which the match progress data was uploaded to the server; and
   a control unit that appends image data that is based on the match progress data corresponding to a time point at which the capturing data was acquired to the capturing data to generate appended data when the capturing data of the match is obtained by the terminal-side camera in a state in which a chatting application that displays the match progress data and the chatting data obtained by the communication unit in different regions of a display unit is activated.

2. A chatting system comprising:
   a server to which match progress data indicating a progress state of a match and chatting data indicating a content of a chatting corresponding to the match are uploaded; and
   a chatting terminal including:
   a terminal-side camera configured to be able to acquire capturing data;
   a communication unit configured to be able to receive the match progress data and the chatting data from the server and configured to be able to transmit data including the chatting data and the capturing data obtained by the terminal-side camera to the server;

a storage unit that stores the match progress data obtained by the communication unit in correlation with an upload time at which the match progress data was uploaded to the server; and a control unit that appends image data that is based on the match progress data corresponding to a time point at which the capturing data was acquired to the capturing data to generate appended data when the capturing data of the match is obtained by the terminal-side camera in a state in which a chatting application that displays the match progress data and the chatting data obtained by the communication unit in different regions of a display unit is activated.

3. The chatting system according to claim 2, wherein the server includes a face recognition unit that identifies a participant participating in the match on the basis of a face image and a predetermined comparison image when the face image of the participant is included in the appended data.

4. The chatting system according to claim 3, wherein the server appends the match progress data of the participant identified by the face recognition unit to the appended data.

5. A chatting display method comprising:

receiving, using a chatting terminal, match progress data indicating a progress state of a match and chatting data indicating a content of a chatting corresponding to the match from a server to which the match progress data and the chatting data are uploaded;

capturing a match using the terminal-side camera provided in the chatting terminal to acquire capturing data;

storing the received match progress data in correlation with an upload time at which the match progress data was uploaded to the server; and appending image data that is based on the match progress data corresponding to a time point at which the capturing data was acquired to the capturing data to generate appended data when the capturing data of the match is obtained by the terminal-side camera in a state in which a chatting application that displays the received match progress data and the received chatting data in different regions of a display unit is activated.

6. A non-transitory computer readable recording medium storing therein a chatting display program for causing a computer to execute:

a process of receiving, using a chatting terminal, match progress data indicating a progress state of a match and chatting data indicating a content of a chatting corresponding to the match from a server to which the match progress data and the chatting data are uploaded;

a process of capturing a match using the terminal-side camera provided in the chatting terminal to acquire capturing data;

a process of storing the received match progress data in correlation with an upload time at which the match progress data was uploaded to the server; and a process of appending image data that is based on the match progress data corresponding to a time point at which the capturing data was acquired to the capturing data to generate appended data when the capturing data of the match is obtained by the terminal-side camera in a state in which a chatting application that displays the received match progress data and the received chatting data in different regions of a display unit is activated.

* * * * *